(12) United States Patent
Schmid et al.

(10) Patent No.: US 7,647,412 B2
(45) Date of Patent: Jan. 12, 2010

(54) METHOD FOR MANAGEMENT AND/OR ADMINISTRATION OF ACCESS AUTHORIZATIONS IN A NETWORK

(75) Inventors: Sandra Schmid, Friedrichshafen (DE); John Sobeck, Langenargen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 460 days.

(21) Appl. No.: 10/946,542

(22) Filed: Sep. 21, 2004

(65) Prior Publication Data

US 2005/0086229 A1   Apr. 21, 2005

(30) Foreign Application Priority Data

Sep. 30, 2003   (DE) ................. 103 45 323

(51) Int. Cl.
  *G06F 15/16*   (2006.01)
  *G06F 15/173*  (2006.01)
  *G06F 7/04*    (2006.01)
(52) U.S. Cl. ................. 709/229; 709/226; 726/26

(58) Field of Classification Search ................. 709/227, 709/226, 229; 726/5, 26
See application file for complete search history.

(56) References Cited

U.S. PATENT DOCUMENTS

| 5,911,143   | A   |   | 6/1999 | Deinhart et al. |
|-------------|-----|---|--------|-----------------|
| 6,381,579   | B1  | * | 4/2002 | Gervais et al. ................. 705/8 |
| 6,904,434   | B1  | * | 6/2005 | Wallach et al. ................. 707/10 |
| 2002/0023059 | A1 | * | 2/2002 | Bari et al. ..................... 705/76 |
| 2003/0046576 | A1 |   | 3/2003 | High, Jr. et al. |

* cited by examiner

*Primary Examiner*—William C Vaughn, Jr.
*Assistant Examiner*—Peling A Shaw
(74) *Attorney, Agent, or Firm*—Davis & Bujold, P.L.L.C.

(57) ABSTRACT

Within the scope of the method for management and/or administration of access authorizations in a network, especially of access authorizations for internet and/or network main portals, the user administration is designed as a standardized, web protected and a decentralized process. For each main portal, a separate application is required and it is made possible for the user to seek possible internet and/or network main portals.

11 Claims, 2 Drawing Sheets

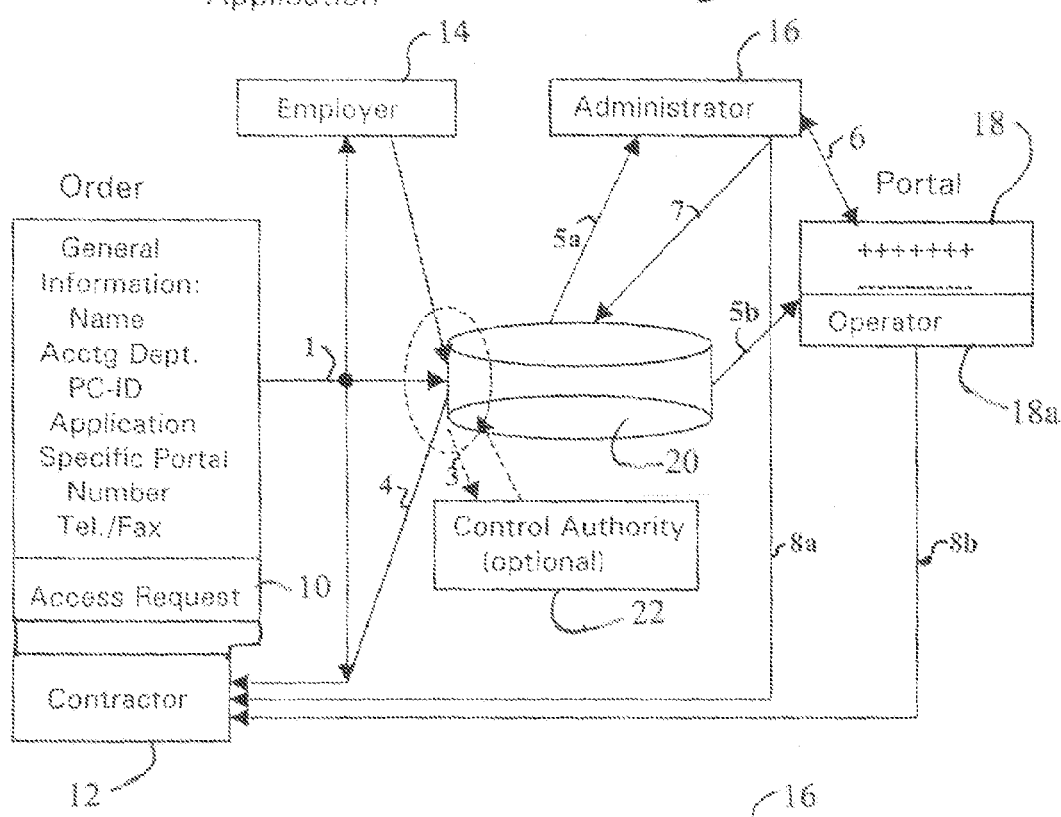
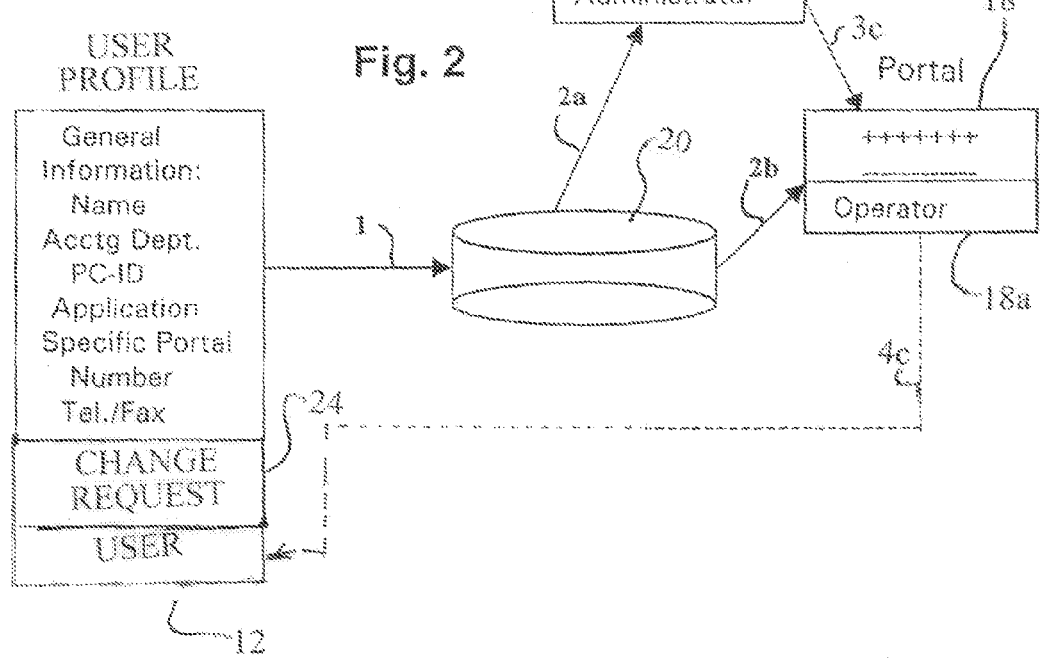

METHOD FOR MANAGEMENT AND/OR ADMINISTRATION OF ACCESS AUTHORIZATIONS IN A NETWORK

This application claims priority from German Application Serial No. 103 45 323.7 filed Sep 30, 2003.

FIELD OF THE INVENTION

This invention relates to a method for management and administration of access authorization in a network.

BACKGROUND OF THE INVENTION

U.S. Pat. No. 6,381,579 B1 describes a system and method by means of a so-called "web-browser", to make it possible for users to access internet sites with certainty; the users then have a tailored menu for use available. This method was developed in order to ensure the handling of online businesses such as between contractors and customers, as can be the case in a large enterprise. Different users have different access rights which in real time can be changed online.

In enterprises and large organizations effective user management is necessary, especially with relation to access rights to sensitive data. Besides, great flexibility is required in order to take fluctuations in personnel composition and fields of duty into consideration.

The problem on which this invention is based is to provide for management and/or administration of access authorizations in a network; a method which makes simple and effective management and/or administration possible.

SUMMARY OF THE INVENTION

It is accordingly proposed to design the user administration as a standardized, preferably web supported and decentralized process. An application of the user is required which is preferably designed to be interactive. Besides, within the scope of an advantageous alternative of the inventive method, it is proposed that for an access to internet and/or network main portal, one application is respectively required thus making possible for the users to seek possible internet and/or network main portals.

It is possible, according to the invention, to change personal data or data that is specific to the user after an application has been made at an internet and/or network main portal. This is advantageously done by the user, the positions affected by the change being informed.

According to the invention, a cancellation of an access authorization is further provided which can be initiated by the user, his employer and/or the personnel section.

BRIEF DESCRIPTION OF THE DRAWINGS

The invention will now be described, by way of example, with reference to the accompanying drawings in which:

FIG. 1 is a diagram illustrating the inventive application process;

FIG. 2 is a diagram illustrating the change of personal data of the user according to the inventive method.

DETAILED DESCRIPTION OF THE INVENTION

Figure 3:
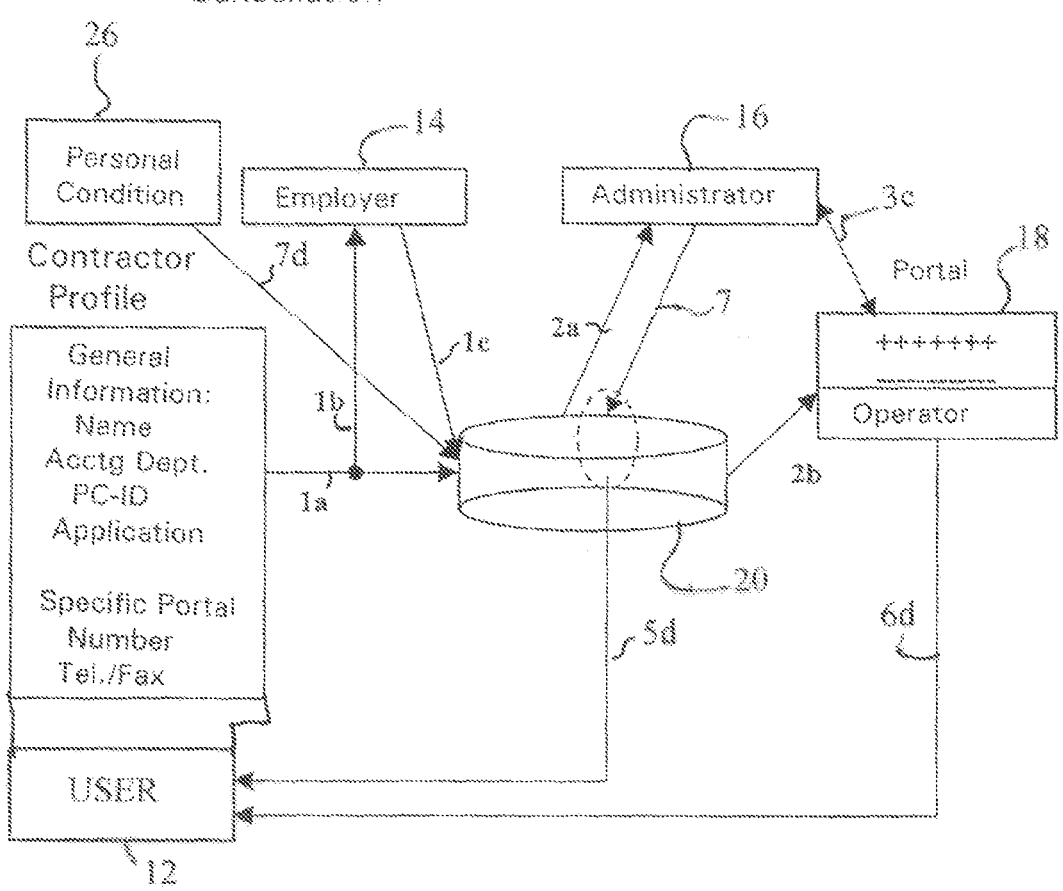
FIG. 3 is one other diagram showing the cancellation of an access authorization.

It is, therefore, proposed according to the invention that for access to internet and/or network main portals, a respective application by the user is required, it being made possible to the user to seek possible internet and/or network main portals.

This is illustrated in FIG. 1. Here the customer or user 12 generates an access request 10, for example, to the firm's internal network (intranet) which contains data of the user (for example, name PC-ID, etc.) and data of the main portal for which access is applied. This step is labeled in the Figure with the reference numeral 1.

After dispatch of the request (access request 10), a notice is sent to the employer 14 and to the user or customer 12.

Subsequently the access request 10 is either dismissed or acknowledged; in case of dismissal, the customer or user 12 is preferably informed by a dismissal notice (reference numeral 4). It is inventively provided that for the case of a "sensitive" and/or new internet and/or network main portal 18, the access request 10 is additionally checked (optional) by another control authority 22 so that a release of the dismissal notice is effected by the control authority 22, this is labeled reference numeral 3 in FIG. 1.

For the case of acceptance or acknowledgment of the access request 10, notice 5a thereof is sent to the administrator 16 and an acceptance notice 8a is generated by the administrator 16 which serves to inform the user or customer 12 that the user's information has been registered at the main portal 18; this operation can also be advantageously further automated by means of a structured notice (reference numeral 5b) directly at the main portal 18. The user's pieces of information are then registered at the main portal 18, as indicated by reference numeral 6, and the user's data specific to the main portal 18, such as identification and password, are received by the main portal 18 or main portal operator 18a. In addition, the registered request is acknowledged in the administration tool 20 by the administrator 16, as indicate by reference numeral 7.

It is inventively provided that the user's data specific to the main portal 18 is passed to the user or customer 12 either via the administrator 16 or directly by the main portal operator 18a as indicated by reference numeral 8b.

In FIG. 2 is diagrammatically illustrated the inventive procedure to edit personal data. The change request(s) 24 are here initiated by the user 12, preferably via the web-browser or any other adequate tool (reference numeral 1) and, within the scope of a first alternative, the changes specific to the main portal 18 are relayed, via the administrator 16, (reference numerals, 2a and 3c) to the main portal 18 wherein the changes are registered. One other specially advantageous alternative provides that the information about changes specific to the main portal 18, for example, about a structured notice, are communicated directly to the user or customer 12 or to the main portal 18. After effecting a change, the user or customer 12 can directly receive a corresponding acknowledgment 4c.

To cancel the access authorization (see FIG. 3), it is proposed that the user enters a corresponding cancellation petition (reference numeral 1a), the employer 14 receiving a control mail (reference numeral 1b), and the cancellation request can be acknowledged or dismissed by the employer 14; this step corresponds to the reference numeral 1c in FIG. 3.

The information or cancellation request is then passed, via the administrator 16, to the main portal 18, as indicated by reference numerals 2a and 3c or is advantageously communicated directly to the main portal 18, for example, via structured notice (step 2b) where the access is canceled or deactivated. An acknowledgment 7 of the cancellation of access is sent to the administrator tool 20; the user 12 is correspondingly informed, for example, via a notice 5d in FIG. 3. Alternatively or additionally, the user 12 can be directly informed by the main portal 18, as illustrated by the arrow provided with the reference numeral 6d.

One advantageous development provides that an access can be canceled or deactivated (arrow 7d) by personnel department 26 via an adequate interface with the administrator tool 20.

The method introduced here for management and/or administration of access authorizations in a network, makes a transparent, efficient and decentralized means available which offers clearances to the co-workers and to the enterprise of extensive safety and data protection.

The invention claimed is:

1. A method of managing authorization access to at least one of an internet and internal network main portals of an employer, the method comprising:
   storing personal data, relating to a plurality of users, and sensitive data, of an employer, in a network of the employer in a web protected and decentralized process in which a separate user data application is required for access of each main portal of the network;
   when one of the plurality of users requires access to data of the employer, requiring each user to initiate a separate user data application to the employer for each portal of the network that the user desires to access;
   for each user data application, notifying the user of one of acceptance of or dismissal of each separate user data application;
   providing, only upon accepting the user data application, the user with access the requested data and permitting the user to access the data and enter one or more changes to the accessed data;
   notifying any affected department of the employer of the one or more entered changes made by the user to the accessed data;
   following completion of the one or more entered changes, saving the one or more entered changes in the network of the employer; and
   exiting the network of the employer.

2. The method according to claim 1, further comprising the step of, when the user data application relates to access of the sensitive data of the employer, additionally requiring acceptance of the user data application by a control authority; and
   providing, only upon accepting the user data application by the control authority, the user with access to the sensitive data of the employer.

3. The method according to claim 1, further comprising the step of relaying, via an administrator, the changes to the main portal where the changes are registered.

4. The method according to claim 1, further comprising the step of permitting the user, the employer and a personnel department of the employer to initiate cancellation of an access authorization via at least one of the internet and internal network main portals.

5. The method according to claim 1, wherein the user data application comprises:
   generating and dispatching of an access request by the user, and the access request containing user's data and data of the main portal for which access is requested;
   generating a notice to the employer and the user;
   checking the access request, for a case of one or more of "sensitive", new internet and internal network main portal, additionally the access request is checked by another control authority and, in case of dismissal, the user is informed by a notice;
   in case of acceptance of the access request, generation of a notice to the administrator serving to indicate that user's information is registered in the main portal or generation of a structured notice directly communicated to the main portal;
   registering the user's information in the main portal;
   generation of the user's data specific to the main portal by the main portal or main portal operator and passing the data, via one of the administrator or directly through the main portal or the main portal operator, to the user; and
   acknowledging the request by the administrator in an administration tool.

6. The method according to claim 1, wherein a change of user's personal data comprises:
   requesting at least one change by the user;
   relaying the at least one change specific to the main portal via one of the administrator or directly by a structured notice to the main portal or to an employer or contractor and registering the at least one change in the main portal; and
   acknowledging the at least one change to the user.

7. The method according to claim 1, wherein a cancellation or deactivation of an access comprises the steps of:
   requesting a cancellation order by at least one of the user, the employer or a personnel department of the employer or, in a case of a request by the user, the employer receives a control notice and the cancellation order can be acknowledged or dismissed by the employer;
   relaying the information via the administrator or directly to the main portal via structured notice where the access is canceled or deactivated;
   acknowledging cancellation or deactivation of the access to an administrator tool;
   notifying the user by one or more of the administration tool and directly by the main portal.

8. A method of managing authorization access to at least one of an internet and internal network main portals of an employer, the method comprising:
   storing personal data, relating to a plurality of users, and sensitive data, of an employer, in a network of the employer in a web protected and decentralized process in which a separate user data application is required for access of each main portal of the network;
   when one of the plurality of users requires access to data of the employer, requiring each user to initiate the separate user data application to the employer for each portal of the network that the user desires to access;
   for each user data application, notifying the user of one of acceptance of or dismissal of each separate user data application;
   providing, only upon accepting the user data application, the user with access the requested data and permitting the user to access the data and enter one or more changes to the accessed data;
   when the user data application relates to access of the sensitive data of the employer, additionally requiring acceptance of the user data application by a control authority;
   providing, only upon accepting the user data application by the control authority, the user with access to the sensitive data of the employer;
   notifying any affected department of the employer of the one or more entered changes made by the user to the accessed data;
   relaying, via an administrator, the changes to the main portal where the changes are registered;

permitting the user, the employer and a personnel department of the employer to initiate cancellation of an access authorization via at least one of the internet and internal network main portals;

following completion of the one or more entered changes, saving the one or more entered changes in the network of the employer; and exiting the network of the employer.

9. The method according to claim 8, wherein the user data application comprises:

generating and dispatching of an access request by the user, and the access request containing user's data and data of the main portal for which access is requested;

generating a notice to the employer and the user;

checking the access request, for a case of one or more of "sensitive", new internet and internal network main portal, additionally the access request is checked by anther control authority and, in case of dismissal, the user is informed by a notice;

in case of acceptance of the access request, generation of a notice to the administrator serving to indicate that user's information is registered in the main portal or generation of a structured notice directly communicated to the main portal;

registering the user's information in the main portal;

generation of the user's data specific to the main portal by the main portal or main portal operator and passing the data, via one of the administrator or directly through the main portal or the main portal operator, to the user; and acknowledging the request by the administrator in an administration tool.

10. The method according to claim 8, wherein a change of user's personal data comprises:

requesting at least one change by the user;

relaying the at least one change specific to the main portal via one of the administrator or directly by a structured notice to the main portal or to an employer or contractor and registering the at least one change in the main portal; and acknowledging the at least one change to the user.

11. The method according to claim 8, wherein a cancellation or deactivation of an access comprises the steps of:

requesting a cancellation order by at least one of the user, the employer or a personnel department of the employer or, in a case of a request by the user, the employer receives a control notice and the cancellation order can be acknowledged or dismissed by the employer;

relaying the information via the administrator or directly to the main portal via structured notice where the access is canceled or deactivated;

acknowledging cancellation or deactivation of the access to an administrator tool;

notifying the user by one or more of the administration tool and directly by the main portal.

* * * * *